(12) United States Patent
Gorer

(10) Patent No.: US 7,783,547 B1
(45) Date of Patent: Aug. 24, 2010

(54) SYSTEM AND METHOD FOR DETERMINING HEDGE STRATEGY STOCK MARKET FORECASTS

(75) Inventor: Ryan M. Gorer, North Caldwell, NJ (US)

(73) Assignee: HedgeCity Corporation, Boston, MA (US)

( * ) Notice: Subject to any disclaimer, the term of this patent is extended or adjusted under 35 U.S.C. 154(b) by 816 days.

(21) Appl. No.: 11/008,860

(22) Filed: Dec. 10, 2004

(51) Int. Cl.
   *G06Q 40/00* (2006.01)
(52) U.S. Cl. .......................... 705/36 R; 705/35; 705/37
(58) Field of Classification Search ................... 705/35, 705/36 R, 37
   See application file for complete search history.

(56) References Cited

U.S. PATENT DOCUMENTS

| | | | |
|---|---|---|---|
| 6,195,694 | B1* | 2/2001 | Chen et al. ................... 709/220 |
| 6,338,047 | B1 | 1/2002 | Wallman |
| 6,370,516 | B1 | 4/2002 | Reese |
| 6,510,419 | B1 | 1/2003 | Gatto |
| 6,658,467 | B1* | 12/2003 | Rice et al. ................... 709/224 |
| 6,681,211 | B1 | 1/2004 | Gatto |
| 6,832,209 | B1 | 12/2004 | Karp |
| 6,832,210 | B1 | 12/2004 | Li |
| 7,155,510 | B1 | 12/2006 | Kaplan |
| 7,299,204 | B2* | 11/2007 | Peng et al. ................. 705/36 R |
| 7,366,692 | B2* | 4/2008 | Alcaly et al. ................... 705/37 |
| 2001/0032029 | A1* | 10/2001 | Kauffman ..................... 700/99 |
| 2001/0034641 | A1* | 10/2001 | D'Amico et al. .............. 705/12 |
| 2001/0037284 | A1* | 11/2001 | Finkelstein et al. ........... 705/37 |
| 2001/0042037 | A1 | 11/2001 | Kam et al. |
| 2002/0022988 | A1 | 2/2002 | Columbus et al. |
| 2002/0032629 | A1 | 3/2002 | Siegel, Jr. et al. |
| 2002/0116281 | A1* | 8/2002 | Costello et al. ............... 705/26 |
| 2002/0178111 | A1* | 11/2002 | Woodley ..................... 705/38 |
| 2003/0069821 | A1 | 4/2003 | Williams |

(Continued)

FOREIGN PATENT DOCUMENTS

WO    WO 0171526    9/2001

(Continued)

OTHER PUBLICATIONS

Downes, John and Jordan Elliot Goodman. "Dictionary of Finance and Investment Terms" Barron's Educational Series, Inc. 2003. p. 304, (3 pages).*

(Continued)

*Primary Examiner*—James P Trammell
*Assistant Examiner*—Elda Milef
(74) *Attorney, Agent, or Firm*—Clock Tower Law Group; Erik J. Heels; Michael A. Bartley

(57) ABSTRACT

The invention is a system and method for recording, generating and presenting hedge strategy stock market forecasts based upon the collective input of individuals in an investment community. Input gathered from individuals in the investment community is aggregated and processed into consensus hedge strategy forecasts. A randomly generated pair of stock tickers is presented to a user. The user casts a vote by selecting the stock that the user thinks will outperform the other one over a specified period of time. The system records the resulting hedge strategy forecast, which is comprised of a long stock position for the stock chosen and a short stock position for the stock not chosen. The system tabulates input from multiple individuals to calculate consensus forecasts.

25 Claims, 9 Drawing Sheets

U.S. PATENT DOCUMENTS

| | | | |
|---|---|---|---|
| 2004/0133497 A1 | 7/2004 | Spear | |
| 2004/0177021 A1* | 9/2004 | Carlson et al. | 705/36 |
| 2004/0249687 A1* | 12/2004 | Lowell et al. | 705/7 |
| 2005/0171883 A1* | 8/2005 | Dundas et al. | 705/36 |

FOREIGN PATENT DOCUMENTS

| | | |
|---|---|---|
| WO | WO 0221410 | 3/2002 |
| WO | WO 0229646 | 4/2002 |
| WO | WO 04001538 | 12/2003 |

OTHER PUBLICATIONS

"Commodity Trading Manual". Chicago. Glenlake Publishing Company, Ltd. 1998, pp. 108-109. (4 pages).*

Brandt, Jon A. "Forecasting and Hedging: An Illustration of Risk Reduction in the Hog Industry." American Journal of Agricultural Economics, vol. 67, No. 1 Feb. 1985), pp. 24. (8 Pages).*

Yahoo! Finance website, Yahoo! Inc., Sunnyvale, CA. Retrieved on Dec. 10, 2004, retrieved from the Internet (http://finance.yahoo.com), 19 pages.

Motley Fool website, The Motley Fool, Inc., Alexandria, VA. Retrieved on Dec. 10, 2004, retrieved from the Internet (http://www.fool.com), 22 pages.

CBS MarketWatch website, MarketWatch, Inc., San Francisco, CA. Retrieved on Dec. 10, 2004, retrieved from the Internet (http://cbs.marketwatch.com), 21 pages.

ClearStation website, E*TRADE Financial Corporation, New York, NY. Retrieved on Dec. 10, 2004, retrieved from the Internet (http://clearstation.etrade.com), 23 pages.

Raging Bull website, Lycos, Inc., Waltham, MA. Retrieved on Dec. 10, 2004, retrieved from the Internet (http://www.ragingbull.com), 12 pages.

BoardCentral website, Accella Group Inc., New York, NY. Retrieved on Dec. 10, 2004, retrieved from the Internet (http://www.boardcentral.com), 12 pages.

FOLIOfn website, FOLIOfn, Inc., Vienna, VA. Retrieved on Dec. 10, 2004, retrieved from the Internet (http://www.foliofn.com), 36 pages.

StarMine website, StarMine Corporation, San Francisco, CA. Retrieved on Dec. 10, 2004, retrieved from the Internet (http://www.starmine.com), 50 pages.

Investars website, Netologic Inc., Hoboken, NJ. Retrieved on Dec. 10, 2004, retrieved from the Internet (http://www.investars.com), 23 pages.

Zacks Investment Research website, Zacks Investment Research, Inc., Chicago, IL. Retrieved on Dec. 10, 2004, retrieved from the Internet (http://www.zacks.com), 36 pages.

Forbes website, Forbes.com Inc., New York, NY. Retrieved on Dec. 10, 2004, retrieved from the Internet (http://www.forbes.com), 14 pages.

TheStreet.com website, TheStreet.com, Inc., New York, NY. Retrieved on Dec. 10, 2004, retrieved from the Internet (http://www.thestreet.com), 12 pages.

ValuEngine website, ValuEngine, Inc., Miami, FL. Retrieved on Dec. 10, 2004, retrieved from the Internet (http://www.valuengine.com), 10 pages.

Penny Share Advisor website, ATM, Indianola, WA. Retrieved on Dec. 10, 2004, retrieved from the Internet (http://www.pennyshareadvisor.com), 6 pages.

Standard and Poor's website, The McGraw-Hill Companies, Inc., New York, NY. Retrieved on Dec. 10, 2004, retrieved from the Internet (http://www.standardandpoors.com), 14 pages.

Morningstar website, Morningstar, Inc., Chicago, IL. Retrieved on Dec. 10, 2004, retrieved from the Internet (http://www.morningstar.com), 8 pages.

Reuters website, Reuters Group PLC, London, UK. Retrieved on Dec. 10, 2004, retrieved from the Internet (http://www.reuters.com), 12 pages.

* cited by examiner

HedgeCity

| Welcome | Stock Voting | Hedge Strategies | Community Portfolios | Member Rankings | My Profile | About HedgeCity | Contact | Help |

Hello, Stocksgalore (Overall Rank #8)  Sign Out

Category Hedge Strategies | Company Hedge Strategies

Find Companies By Name
A - B - C - D - E - F - G - H - I - J
K - L - M - N - O - P - Q - R - S - T
U - V - W - X - Y - Z - Others

Find Companies By Ticker
A - B - C - D - E - F - G - H - I - J
K - L - M - N - O - P - Q - R - S - T
U - V - W - X - Y - Z Ford Motor Company (F)
Furniture Brands Internation (FBN)
Friedman Billings Ramsey Gro (FBR)
Fairchild Semiconductor Inte (FCS)
Federated Department Str. (FD)
Foundry Networks Inc. (FDRY)
FedEx Corporation (FDX)
Fairmont Hotels & Resorts In (FHR)
Fiat S.p.A (ADR) (FIA)
Fifth Third Bancorp (FITB)
Foot Locker Inc (FL)
Flextronics International Lt (FLEX)
Fannie Mae (FNM)
Fortune Brands Inc. (FO)
Sprint Corp (FON)
Fox Entertainment Group (FOX)
Freddie Mac (FRE)
Frontier Airlines Inc. (FRNT)

Frontier Airlines Inc. (FRNT)

The most popular hedge strategy forecasts from the HedgeCity community are shown below. A large vote differential indicates a strong consensus. Clicking a stock ticker link shows the hedge strategies for the selected company. In the last column, indicate your vote for which stock you think will perform better.

Include votes from: [All guests and registered members ▼]  [Go]

| Long Stock | Short Stock | Agree Votes | Disagree Votes | Vote Differential | My Vote |
|---|---|---|---|---|---|
| CAL | FRNT | 4 | 1 | 3 | CAL vs FRNT |
| UAIR | FRNT | 3 | 0 | 3 | UAIR vs FRNT |
| ATAH | FRNT | 2 | 1 | 1 | ATAH vs FRNT |
| LUV | FRNT | 1 | 0 | 1 | LUV vs FRNT |
| FRNT | BAB | 1 | 0 | 1 | FRNT vs BAB |
| FRNT | NWAC | 1 | 0 | 1 | FRNT vs NWAC |
| FRNT | AAI | 1 | 0 | 1 | FRNT vs AAI |
| ALK | FRNT | 1 | 0 | 1 | ALK vs FRNT |
| AKH | FRNT | 1 | 0 | 1 | AKH vs FRNT |
| DAL | FRNT | 1 | 0 | 1 | DAL vs FRNT |
| FRNT | AWA | 1 | 1 | 0 | FRNT vs AWA |

HedgeCity

| Welcome | Stock Voting | Hedge Strategies | Community Portfolios | Member Rankings | My Profile | About HedgeCity | Contact | Help |

Hello, Stocksgalore (Overall Rank #8)  Sign Out

HedgeCity Community Investment Portfolios

Investment portfolios have been constructed that systematically follow the HedgeCity community hedge strategy forecasts on a daily basis. The performance results of these investment portfolios are presented below.

Include votes from: [All guests and registered members ▼]  [Go]

Consumer Goods

| Investment Portfolio | 1 Week | 2 Weeks | 1 Month | 2 Months | 3 Months | 6 Months | 1 Year |
|---|---|---|---|---|---|---|---|
| Apparel & Accessories - Equal Weighted | -0.2% | +0.6% | +0.5% | +0.6% | +0.5% | n/a | n/a |
| Apparel & Accessories - Vote Weighted | -0.2% | +0.6% | +0.4% | +0.6% | +0.5% | n/a | n/a |
| Appliances & Tools - Equal Weighted | -0.1% | +0.3% | +0.2% | +0.1% | -0.1% | n/a | n/a |
| Appliances & Tools - Vote Weighted | -0.3% | +0.1% | +0.1% | +0.1% | -0.2% | n/a | n/a |
| Audio & Video Equipment - Equal Weighted | 0.0% | n/a | n/a | n/a | n/a | n/a | n/a |
| Audio & Video Equipment - Vote Weighted | 0.0% | n/a | n/a | n/a | n/a | n/a | n/a |
| Auto & Truck Manufacturers - Equal Weighted | +1.2% | n/a | n/a | n/a | n/a | n/a | n/a |
| Auto & Truck Manufacturers - Vote Weighted | +1.2% | n/a | n/a | n/a | n/a | n/a | n/a |
| Beauty Products - Equal Weighted | 0.0% | 0.0% | 0.0% | 0.0% | 0.0% | n/a | n/a |
| Beauty Products - Vote Weighted | -0.1% | 0.0% | -0.1% | 0.0% | 0.0% | n/a | n/a |
| Footwear - Equal Weighted | +0.1% | n/a | n/a | n/a | n/a | n/a | n/a |
| Footwear - Vote Weighted | +0.1% | n/a | n/a | n/a | n/a | n/a | n/a |

FIG. 7

HedgeCity | Welcome | Stock Voting | Hedge Strategies | Community Portfolios | Member Rankings | My Profile | About HedgeCity | Contact | Help Hello, stocksgalore (Overall Rank #3) — Sign Out

Overall Member Rankings | Category Member Rankings

The top performing members from the HedgeCity community are shown below.
Clicking a member link shows the member's performance scorecard. Top members
for each category are shown in Category Member Rankings.

| Rank | Member Name | 2 Week Return |
|---|---|---|
| 1 | hedgewinner | +1.8% |
| 2 | positivereturns | +0.9% |
| 3 | stocksgalore | +0.9% |
| 4 | FredStockMan | +0.6% |
| 5 | happymember | +0.5% |
| 6 | RetailQueen | +0.3% |
| 7 | LongandShort | +0.2% |
| 8 | englishmajor | 0.0% |
| 9 | mypicks | 0.0% |
| 10 | LarryTexas | -0.4% |

Return calculations are as of the close of trading on 03-Sep-2004.

HedgeCity | Welcome | Stock Voting | Hedge Strategies | Community Portfolios | Member Rankings | My Profile | About HedgeCity | Contact | Help Hello, stocksgalore (Overall Rank #3) — Sign Out Overall Member Rankings | Category Member Rankings

Select a Category

Consumer Goods
Apparel & Accessories, Appliances & Tools, Audio & Video Equipment, Auto & Truck Manufacturers, Beauty Products, Beverages Alcoholic, Beverages Non-Alcoholic, Consumer Foods, Footwear, Furniture, Household Products Financial
Accident & Health Insurance, Financial Services & Banks, Insurance Brokerage, Investment Management, Investment Trading, Life/Prop/Casualty Insurance, Regional Banks - Canada, Regional Banks - US Healthcare
Biotechnology & Pharma, Major Drugs, Medical Equipment & Supplies Retail
Apparel, Auto Parts & Services, Books, Department & Discount, Drugs, Fine Jewelry, Grocery, Home Improvement, Household, Office Supplies, Pet Supplies, Specialty, Sporting Goods, Technology, Wholesale Clubs Services
Amusement Parks, Broadcasting & Cable TV, Casinos, Cruise Lines, Hotels & Motels, Mortgage

Appliances & Tools

The top performing members from the HedgeCity community for this category are
shown below. Clicking a member link shows the member's performance scorecard.

| Rank | Member Name | 2 Week Return |
|---|---|---|
| 1 | FredStockMan | +3.7% |
| 2 | happymember | +2.1% |
| 3 | stocksgalore | +2.1% |
| 4 | LarryTexas | -1.8% |
| 5 | positivereturns | +1.8% |
| 6 | englishmajor | +1.0% |
| 7 | RetailQueen | 0.0% |
| 8 | LongandShort | -3.6% |

Return calculations are as of the close of trading on 03-Sep-2004.

FIG. 9

HedgeCity | Welcome | Stock Voting | Hedge Strategies | Community Portfolios | Member Rankings | My Profile | About HedgeCity | Contact | Help Hello, stocksgalore (Overall Rank #3) — Sign Out Overall Member Rankings | Category Member Rankings

Performance Scorecard: stocksgalore

| Category | 1 Week | 2 Weeks | 1 Month | 2 Months | 3 Months | 6 Months | 1 Year |
|---|---|---|---|---|---|---|---|
| Aerospace & Defense | -0.1% | +0.8% | +0.8% | +1.1% | +1.4% | n/a | n/a |
| Airlines | +2.3% | +2.4% | +1.7% | -0.4% | 0.0% | n/a | n/a |
| Apparel & Accessories | -0.3% | -0.9% | -0.7% | -0.5% | +1.4% | n/a | n/a |
| Appliances & Tools | +1.3% | +2.1% | +1.9% | +2.1% | +0.9% | n/a | n/a |
| Major Drugs | -0.1% | -0.1% | -0.4% | -1.3% | -1.4% | n/a | n/a |
| Recreation - Video Rental | -1.1% | +0.9% | +2.6% | +1.6% | +0.7% | n/a | n/a |
| Overall | +0.3% | +0.9% | +1.0% | +0.4% | +0.5% | n/a | n/a |

Return calculations are as of the close of trading on 03-Sep-2004.

HedgeCity | Welcome | Stock Voting | Hedge Strategies | Community Portfolios | Member Rankings | My Profile | About HedgeCity | Contact | Help Hello, stocksgalore (Overall Rank #3) — Sign Out Performance Scorecard | Category Voting History | Company Voting History | Registration Info | Change Password

Select a Category

Consumer Goods
Apparel & Accessories, Appliances & Tools, Audio & Video Equipment, Auto & Truck Manufacturers, Beauty Products, Beverages Alcoholic, Beverages Non-Alcoholic, Consumer Foods, Footwear, Furniture, Household Products

Financial
Accident & Health Insurance, Financial Services & Banks, Insurance Brokerage, Investment Management, Investment Trading, Life/Prop/Casualty Insurance, Regional Banks - Canada, Regional Banks - US

Healthcare
Biotechnology & Pharma, Major Drugs, Medical Equipment & Supplies

Retail
Apparel, Auto Parts & Services, Books, Department & Discount, Drugs, Fine Jewelry, Grocery, Home Improvement, Household, Office Supplies, Pet Supplies, Specialty, Sporting Goods, Technology, Wholesale Clubs

Services
Amusement Parks, Broadcasting & Cable TV, Casinos, Cruise Lines, Hotels & Motels, Mortgage

Aerospace & Defense

Your stock voting history is shown below. Clicking a stock ticker link shows your voting history for the selected company. Clicking a "close" link immediately changes the end date to the next trading close date for the corresponding stock vote.

| Start Date | End Date | Long Stock | Short Stock | Long Return | Short Return | Net Return | |
|---|---|---|---|---|---|---|---|
| 02-Sep-2004 | 04-Oct-2004 | NOC | LMT | -0.5% | +0.1% | -0.2% | Close |
| 02-Sep-2004 | 04-Oct-2004 | NOC | GD | -0.5% | +0.7% | +0.1% | Close |
| 02-Sep-2004 | 04-Oct-2004 | LMT | GD | -0.1% | +0.7% | +0.3% | Close |
| 02-Sep-2004 | 04-Oct-2004 | BA | LMT | -1.0% | -0.1% | -0.4% | Close |
| 02-Sep-2004 | 04-Oct-2004 | GD | HON | -0.7% | +0.5% | -0.1% | Close |
| 02-Sep-2004 | 04-Oct-2004 | BA | NOC | -1.0% | +0.5% | -0.2% | Close |
| 02-Sep-2004 | 04-Oct-2004 | HON | NOC | -0.5% | +0.5% | 0.0% | Close |
| 02-Sep-2004 | 04-Oct-2004 | BA | HON | -1.0% | +0.5% | -0.2% | Close |
| 02-Sep-2004 | 04-Oct-2004 | LMT | HON | -0.1% | +0.5% | +0.2% | Close |
| 02-Sep-2004 | 04-Oct-2004 | BA | GD | -1.0% | +0.7% | -0.1% | Close |

Return calculations are as of the close of trading on 03-Sep-2004 or as of the stock vote's End Date, whichever is earlier.

FIG. 11

HedgeCity

| | Welcome | Stock Voting | Hedge Strategies | Community Portfolios | Member Rankings | My Profile | About HedgeCity | Contact | Help |

Hello, stocksgalore (Overall Rank: #3)  Sign Out

Performance Scorecard | Category Voting History | Company Voting History | Registration Info | Change Password

Find Companies By Name

A-B-C-D-E-F-G-H-I-J
K-L-M-N-O-P-Q-R-S-T
U-V-W-X-Y-Z-Others

Find Companies By Ticker

A-B-C-D-E-F-G-H-I-J
K-L-M-N-O-P-Q-R-S-T
U-V-W-X-Y-Z

National City Corporation (NCC)
New Century Financial (NCEN)
Netflix Inc. (NFLX)
Norsk Hydro ASA (ADR) (NHY)
Blue Nile Inc. (NILE)
NEC Corporation (ADR) (NIPNY)
NIKE Inc. (NKE)
The Neiman-Marcus Group Inc. (NMGA)
NDS Group plc (ADR) (NNDS)
Northrop Grumman Corporation (NOC)
Nokia Corporation (ADR) (NOK)
Novell Inc. (NOVL)
Nissan Motor Co. Ltd. (ADR) (NSANY)
Norfolk Southern Corp. (NSC)
National Semiconductor Corpo (NSM)
Nortel Networks Corporation (NT)
Network Appliance Inc. (NTAP)
NTL Incorporated (NTLI)

Northrop Grumman Corporation (NOC)

Your stock voting history is shown below. Clicking a stock ticker link shows your voting history for the selected company. Clicking a "close" link immediately changes the end date to the next trading close date for the corresponding stock vote.

| Start Date | End Date | Long Stock | Short Stock | Long Return | Short Return | Net Return | |
|---|---|---|---|---|---|---|---|
| 02-Sep-2004 | 04-Oct-2004 | NOC | LMT | -0.5% | +0.1% | -0.2% | Close |
| 02-Sep-2004 | 04-Oct-2004 | NOC | GD | -0.5% | +0.7% | +0.1% | Close |
| 02-Sep-2004 | 04-Oct-2004 | BA | NOC | -1.0% | +0.5% | -0.2% | Close |
| 02-Sep-2004 | 04-Oct-2004 | HON | NOC | -0.5% | +0.5% | 0.0% | Close |

Return calculations are as of the close of trading on 03-Sep-2004 or as of the stock vote's End Date, whichever is earlier.

FIG. 12

SYSTEM AND METHOD FOR DETERMINING HEDGE STRATEGY STOCK MARKET FORECASTS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Copyright 2004 HedgeCity Corporation. All rights reserved.

CROSS REFERENCE TO RELATED APPLICATIONS

None.

BACKGROUND OF THE INVENTION

1. Field of the Invention

The invention relates generally to financial investing. The invention relates more specifically to stock market hedge strategies.

2. Description of Prior Art

Investing in stocks, securities, and other types of financial instruments can protect assets and produce gains. Yet such investing carries an accompanying risk of loss. One method of minimizing the risk of loss is by hedging. Hedging is an investment strategy designed to reduce investment risk by taking an offsetting position through the use of financial instruments such as options, short sales or futures contracts.

A particular hedging technique relating to stocks is called a long-short equity strategy, which entails having a portfolio of both long positions and short positions in stocks. In a long-short equity portfolio, the long positions can have different market correlations, industry exposures and/or money weighting than the short positions. A particular type of long-short equity strategy is called market-neutral, which entails having long positions that equally offset the short positions with regard to market correlations, industry exposures and money weighting. The offsetting characteristics of a market-neutral equity strategy strive toward reducing market risk to close to zero. Even though market risk is almost eliminated, successful market-neutral equity strategies, as with all investment strategies, require the proper selection of securities in order to achieve positive investment returns.

There are many web-based organizations involved in providing stock market investment advice to individuals. These organizations can be divided into six main groups: (1) stock message boards, (2) portfolio ranking and presentation providers, (3) packaged portfolio investment providers, (4) research analyst performance trackers, (5) investment advice websites and newsletters, and (6) investment research report repositories.

Stock messages boards are comprised of websites which provide discussion forums for individual stocks. For each individual stock, a message board exists to which members post qualitative, free-form commentary regarding the company's prospects. Some message boards additionally have the feature of capturing more structured data regarding the member's sentiment, whereby the member can indicate a particular investment recommendation such as: strong buy, buy, hold, sell, or strong sell. Examples of businesses in the stock message board space are Yahoo! Finance (finance.yahoo.com), Motley Fool (fool.com), CBS MarketWatch (cbs.marketwatch.com), ClearStation (clearstation.etrade.com), Raging Bull (ragingbull.com), and BoardCentral (boardcentral.com).

Portfolio ranking and presentation providers are comprised of websites which provide a facility for members to maintain a hypothetical portfolio of stocks which is then shared with other members of a website. Actual stock prices are used to compute the theoretical returns of the portfolios on a daily basis. The top performing portfolios are ranked and presented for other members to review. An example of a business in this space is ClearStation (clearstation.etrade.com).

Packaged portfolio investment providers are comprised of websites which offer to individual investors the opportunity to invest in proprietary portfolios of stocks. Some of the portfolios are baskets of stocks which are manually constructed by the investment provider and focus on a variety of investment areas. Some of the portfolios are baskets of stocks that are systematically constructed based upon stock screening algorithms, one of which includes the analysis of investment recommendations from top research analysts in the industry. An example of a business in this space is FOLIOfn (foliofn.com).

Research analyst performance trackers are comprised of websites which track the performance of research analysts by measuring the accuracy of earnings estimates and evaluating the investment returns of stock recommendations using actual stock prices. Some websites construct hypothetical portfolios using a weighted average measure based upon analyst recommendations. Examples of businesses in this space are StarMine (starmine.com) and Investars (investars.com).

Investment advice websites and newsletters are comprised of many websites which provide stock market investment advice and investing techniques as well as specific stock recommendations based upon technical or fundamental analyses. In many cases the information is delivered to members in a newsletter on a subscription basis. Examples of businesses in this space are Zacks Investment Research (zacks.com), Forbes (forbes.com), The Street.com (thestreet.com), Motley Fool (fool.com), CBS MarketWatch (cbs.marketwatch.com), ValuEngine (valuengine.com), and Penny Share Advisor (pennyshareadvisor.com).

Investment research report repositories are comprised of websites which provide a repository of research reports available for sale to individuals in the investment community. Some of the websites are themselves the providers of the investment research, while other websites are aggregators of investment research provided by other parties. Research reports are available for individual stocks as well as for particular industries. Examples of businesses in this space are Standard and Poor's (standardandpoors.com), Morningstar (morningstar.com), Zacks Investment Research (zacks.com), Reuters (reuters.com), and Yahoo! Finance (finance.yahoo.com).

There are also a number of patent documents disclosing methods and systems that attempt to improve investments in financial vehicles and to minimize risks.

International Application WO0171526 "System For Ranking Financial Underwriters" (Henley Sep. 27, 2001) discloses a system for ranking individuals or firms who advise and offer predictions on capital markets. The system collects data on the underwriter's past predictions, compares the underwriter predictions with actual performance, and compares several underwriters for rating the underwriters. An underwriter's rating is used to determine future performance.

United States Patent Application 20010042037 "Internet-Based System For Identification, Measurement And Ranking Of Investment Portfolio Management, And Operation Of A Fund Supermarket, Including 'Best Investor' Managed Funds" (Kam et al. Nov. 15, 2001) discloses a system and method for determining the "best investors" in a group of investors. Virtual, performance-based, investment competitions are held that provide portfolios to investors, allow investors to trade, track trades, and rank the performance of investors. The system includes a performance ranking system for advisors in the system.

U.S. Pat. No. 6,338,047 "Method And System For Investing In A Group Of Investments That Are Selected Based On The Aggregated, Individual Preference Of Plural Investors" (Wallman Jan. 8, 2002) discloses investors interacting to dynamically manage a mutual fund reflecting the aggregate preferences of many people. Holdings and weightings change dynamically with the people's preferences.

U.S. Pat. No. 6,681,211 "Security Analyst Estimates Performance Viewing System And Method" (Gatto Jan. 20, 2004) discloses a system and method for analyzing a broker's past performance in recommending investments. Predictions may be weighted in order to produce a composite prediction. This system and method focuses on analyzing past predictions of security analysts to make improved predictions.

United States Patent Application 20040133497 "System And Methods For Determining Performance-Weighted Consensus" (Spear Jul. 8, 2004) discloses a system and method for predicting the performance of an investment vehicle using the past performance of the source of advice, i.e. the financial advisor. This system and method comprises a means for collecting data on past recommendations from financial advisors, calculating the performance of the recommendations, ranking the advisors in a "uniform relative performance scale," and ranking the current stock recommendations of the advisors to determine which stocks will most likely outperform the market. While disclosing a consensus reporting system, the consensus is taken from among expert analysts to rank investment recommendations.

The prior art patent documents and websites generally focus on providing investment advice through either a) unstructured mechanisms for capturing and presenting investment forecasts from individuals in the investment community, or b) data manipulations of the published forecasts from professional research analysts in the investment industry. The prior art generally provides unhedged investment advice that is exposed to market risks, without focusing on the importance of employing hedge strategies which can mitigate such risks. Therefore, an investment forecasting approach is needed which incorporates three key concepts: 1) individuals in the investment community are the ones who impart the actual supply and demand forces in the market that drive future prices, 2) a robust mechanism is required to systematically gather input from individuals in a structured manner and then aggregate and process that collective input into investment forecasts, and 3) a method for neutralizing market risk through hedging is an essential aspect of investing. The result of successfully integrating these three key concepts is a system and method for recording, generating and presenting hedge strategy stock market forecasts based upon the collective input of individuals in the investment community.

BRIEF SUMMARY OF THE INVENTION

The invention is a system and method for recording, generating and presenting hedge strategy stock market forecasts based upon the collective input of individuals in the investment community. Input gathered from individuals in the investment community is aggregated and processed into consensus hedge strategy forecasts. The collective sentiment of individuals in the investment community regarding future stock performance serves as a valid forecasting indicator because these individuals can constitute a representative sample of the universe of individuals who impart the actual supply and demand forces in the market that drive future stock prices.

Each consensus hedge strategy forecast is comprised of a combination of one long stock position and one short stock position. A hedge strategy can yield positive investment returns both in up markets (when both stocks go up) and in down markets (when both stocks go down). The system yields positive investment returns as long as the better performing stock is specified as the long position, i.e. the long stock position has a price change percentage greater than the price change percentage of the short stock position. The system is designed to work with any investment vehicle, but for the sake of simplicity, the following discussion refers primarily to stocks.

The invention is designed to run as a computer application accessible to clients over a network such as the Internet. The computer also handles database and related functions. A web-based model can be used where users can register to become "members" of the website community or where unregistered users can use the system as "guests."

There are several aspects of the system. For ease of explanation, these aspects can be logically grouped into three segments: 1) recording, 2) generating, and 3) presenting.

Recording Segment.

For the recording segment, the system provides a simple and engaging mechanism to solicit and capture input from individuals regarding future stock performance. The system records user input into a database in the form of hedge strategies.

Industry Category Definitions and Stock Pairing Randomization.

Industry-focused categories and the basket of stocks that comprise them are defined and stored in the database. The stocks that comprise a particular industry category are assigned sequence numbers in preparation for random selection.

Stock Pairing Presentation and Stock Voting.

A randomly generated pair of stock tickers from an industry category is presented to a user. The user is any individual in the investment community, such as an individual investor or a professional research analyst.

For a particular stock pairing, the user casts a stock vote by selecting the stock that the user thinks will outperform the other one over, for example, the next 30 days. Upon casting a stock vote, the user may be subsequently presented with another randomly generated stock pairing to evaluate. The user may indicate the desire to skip a particular stock pairing and not cast a stock vote because either a) the user does not have a forecasting opinion about one or both of the stocks, or b) the user thinks that both stocks will perform the same. Upon skipping a stock pairing, another randomly generated stock pairing may be presented to the user to evaluate.

Hedge Strategy Recording.

When the user casts a stock vote by choosing one stock over another, the stock vote is translated into a hedge strategy and recorded in the database as two market positions: 1) a long position for the stock chosen, and 2) a short position for the other stock with which it was paired.

Features and Advantages.

The recording segment provides many features and advantages. Requesting the evaluation of randomly generated pairs of stocks taps the knowledge of individuals regarding subject matter, or a particular company, that they would not necessarily otherwise have thought to voluntarily provide. The system creates an engaging user experience by continually soliciting user input after recording each stock vote. Because there is little effort required to interact with the system and record future stock performance forecasts, more input can be captured from the user than would otherwise be expected. The system quickly obtains a set of data points that provide a clear representation of stock forecasts for users.

The system benefits from the type of performance information it obtains. In prior systems, individuals are requested to forecast the performance of a stock by providing any combination of: a specific price target, an investment recommendation (buy/hold/sell), qualitative commentary regarding a company's fundamentals, or a technical analysis of a stock price chart's behavior. In contrast, the present invention requests and captures relative performance forecasts from users, which provide a compelling set of hedging information, especially when combined with forecasts from other users.

For computing net investment returns from stock positions in a hedge strategy, an increased ending price for a stock in a long position means a positive investment return, while an increased ending price for a stock in a short position, however, means a negative investment return. A decreased ending price for a stock in a long position results in a negative investment return, while a decreased ending price for a stock in a short position results in a positive investment return. As long as the price change percentage for the long stock position is greater than the price change percentage for the short stock position, then there is a positive net investment return for the hedge strategy. In up markets (when both stocks go up), if the price change percentage for the long stock position is +20% (+20% return), and the price change percentage for the short stock position is +10% (−10% return), then the net investment return of the hedge strategy is +10%. In down markets (when both stocks go down), if the price change percentage for the long stock position is −10% (−10% return), and the price change percentage for the short stock position is −20% (+20% return), then the net investment return of the hedge strategy is +10%.

Generating Segment.

For the generating segment, the system tabulates input from multiple individuals in a variety of ways to calculate consensus hedge strategy forecasts.

Tabulation Filter Definitions.

The database includes several defined and stored tabulation filters which dictate various arrangements available for calculating consensus hedge strategy forecasts. Each tabulation filter is defined by a combination of two filter settings: 1) whether guests are included, and 2) a maximum member category ranking. The "guests included" setting indicates whether stock votes from guests (visitors who do not register) are included in consensus calculations. The "maximum member category ranking" setting indicates the extent to which stock votes from ranked members in the community are included in consensus calculations. This setting is only applicable if guests are not included in the calculations. An omitted value for this setting indicates that stock votes from all members, regardless of rank, will be included in consensus calculations. A number specified for this setting indicates that stock votes from only members who have an industry category ranking better than or equal to a predefined threshold value will be included in consensus calculations.

Consensus Hedge Strategy Calculations.

There are two hedge strategies that can exist in the database corresponding to each stock pairing that received a vote.

1) Hedge strategy #1: long position in 1st stock/short position in 2nd stock.

2) Hedge strategy #2: long position in 2nd stock/short position in 1st stock.

For each stock pairing that has at least one hedge strategy stored in the database as a result of a stock vote, the system calculates various consensus hedge strategy representations for that stock pairing (one for each tabulation filter). For a particular tabulation filter, stock votes are tabulated across all users who satisfy the tabulation filter definition to determine the number of votes for each of the two possible hedge strategies associated with the stock pairing. The hedge strategy with the larger number of votes is considered the majority hedge strategy, and the hedge strategy with the smaller number of votes is considered the minority hedge strategy. If both hedge strategies have the same number of votes, one hedge strategy is arbitrarily considered the majority hedge strategy. The majority hedge strategy represents the consensus hedge strategy.

To represent the magnitude of the consensus for a particular consensus hedge strategy, the system calculates the vote differential. The vote differential for the consensus hedge strategy is determined by subtracting the number of votes for the minority hedge strategy from the number of votes for the majority hedge strategy.

Features and Advantages.

The generating segment provides many features and advantages. Calculating the vote differential makes it possible to determine the consensus hedge strategy for a single stock pairing, thereby providing in and of itself a hedge strategy market forecast. Calculating the vote differential makes it possible to compare one hedge strategy from one stock pairing with another hedge strategy from another stock pairing, thereby providing an indication of the relative magnitude of one consensus hedge strategy versus another consensus hedge strategy.

Calculating consensus hedge strategies in multiple ways through the definition and use of various tabulation filters provides a rich set of data which can be leveraged in many ways through statistical analysis.

One tabulation filter is used to include the entire universe of stock votes that have been cast, regardless of whether the user is a guest user or registered user (i.e. member) of the community. Another tabulation filter includes stock votes only from members, which filters out any "noise" from users who are not serious enough about the community to register. Finally, other tabulation filters include stock votes only from members who have demonstrated their ability to successfully forecast the relative performance of stocks within a particular industry category.

Several types of memberships exist to allow members of the community to have different levels of access to data computed using different tabulation filters. Such memberships can have corresponding subscription requirements and/or pricing structures.

Having a rich store of data available in the database provides the system vendor personnel with the ability to mine the data in ways that are not necessarily available to the community. Certain methods of data mining can systematically produce hedge strategy forecasts which on average yield positive investment results when implemented in the stock market.

The consensus hedge strategy generation capabilities of the system can be licensed to other organizations to serve their particular forecasting needs. Some organizations may have an interest in harnessing the collective knowledge of in-house research analysts to produce consensus stock market forecasts. Other organizations may have a customer base of individuals who already contribute stock market forecasts in some form and would value the unique capabilities of the system.

Presenting Segment.

For the presenting segment, the system leverages the store of hedge strategy calculations in the database to present community hedge strategy forecasts and theoretical performance of community investment portfolios. In addition, individual hedge strategy returns for each user are calculated using actual stock prices, thereby allowing for the presentation of member performance and rankings along with the historical details of each stock vote.

Community Hedge Strategy Forecasts.

The presenting segment includes community hedge strategy forecasts. For each industry category stored in the database, the system presents the most compelling hedge strategy forecasts from the community for a given tabulation filter selection. Hedge strategies are sorted by the vote differentials (or other factor) in descending order, as calculated by the selected tabulation filter, thereby presenting the most compelling hedge strategy forecasts at the top of the list. Comparing the magnitude of the consensus for one hedge strategy with another hedge strategy enables users to gauge the relative strength of the forecast (as defined by the selected tabulation filter) as indicated by the community.

For any hedge strategy presented in the list, the user has the opportunity to cast a stock vote relevant to that hedge strategy. Two stock tickers are displayed next to each consensus hedge strategy forecast, one for each of the two stocks that comprise the forecast. Selecting a stock ticker records a stock vote in the database for the user in the same manner that is performed in the recording segment of the system. The system also presents the most compelling hedge strategy forecasts from the community that involve a particular company, with the same tabulation filter selection capabilities.

Community Investment Portfolios.

The presenting segment also includes community investment portfolios, which are portfolios constructed using various calculation methodologies to systematically follow the universe of consensus hedge strategy forecasts for each industry category stored in the database. The technique of constructing community investment portfolios involves taking a snapshot of the entire list of consensus hedge strategy forecasts periodically (e.g. daily) for a particular industry category and tabulation filter, and translating each of the consensus forecasts into a stock vote, similar to how a stock vote is recorded for a single user, but in this case performed for the community as a single entity.

For each community stock vote that is recorded in the database, actual stock prices are used to calculate the hypothetical investment returns that would have resulted from implementing the hedge strategy in the stock market as implied by the community stock vote. Several performance time intervals are defined and stored in the database that dictate the various time intervals over which performance calculations are computed for a portfolio.

Several calculation methodologies are defined and stored in the database that dictate the various ways in which investment returns can be computed for community investment portfolios. One methodology uses equal weighting. For equal weighted calculations, the system treats each hedge strategy investment return equally, performing a simple average calculation to determine the overall investment return of a community investment portfolio. Another methodology uses vote weighting. For vote weighted calculations, the system weighs more heavily a hedge strategy with a larger vote differential than a hedge strategy with a smaller vote differential. A weighted-average calculation using the vote differentials is performed to determine the overall investment return of a community investment portfolio.

Using a particular calculation methodology, the theoretical investment returns are tabulated across all hedge strategies within community investment portfolios periodically (e.g. daily) in order to calculate the overall portfolio investment returns for various performance time intervals. The performance results for all community investment portfolios for all performance time intervals available in the database are presented for review by the user community.

Member Performance and Rankings.

The presenting segment also includes member performance and rankings. For each hedge strategy recorded in the database for each member, actual stock prices are used to calculate the hypothetical investment returns that would have resulted from implementing the hedge strategy in the stock market. Several performance time intervals are defined and stored in the database that dictate the various time intervals over which performance calculations are computed for a member.

For each member in the community, overall performance returns and industry category performance returns are computed periodically (e.g. daily) for various performance time intervals. Each investment return figure is computed using a simple average calculation of all hedge strategies recorded for that member. After the investment performance returns have been computed for all members in the community for a particular time interval, members are ranked by investment return in descending order at the overall level and for each industry category. The top performing members in the community along with their rankings and investment results (for a particular time period) are presented in ascending rank order with overall and industry category results. For each member in the community, a member's performance scorecard presents the member's overall performance returns and industry category performance returns for all performance time intervals.

Member Stock Voting History.

The presenting segment also includes member stock voting history. For each member in the community, the entire history of stock votes for that member is maintained in the database and is available for review by the member at any time. For each hedge strategy recorded in the database by each member, actual stock prices are used to calculate since-inception investment returns that would have resulted from implementing the hedge strategy in the stock market. For each industry category and company, the system presents personalized information including the member's stock voting history and corresponding since-inception performance returns for each hedge strategy.

Features and Advantages.

The presenting segment provides many features and advantages. Presenting hedge strategy forecasts with the largest vote differentials at the top of the list serves to highlight the most compelling hedge strategy forecasts from the community, those that are most likely to achieve positive investment results in both up markets and down markets. Providing users with the ability to view hedge strategy forecasts computed using different tabulation filters increases the richness of data available for analysis and consumption, thereby increasing the value-added service.

Providing the facility to capture a user's stock vote during the presentation of a top hedge strategy forecast serves several purposes. It engages user interaction fostering a well balanced user experience comprised of both information-giving and information-receiving activities. It produces a data collection opportunity beyond what is available in the recording segment of the model, where stock voting is only recorded for randomly generated pairs of stock tickers. It serves to capture more data points for the hedge strategy forecasts that are being presented as the most compelling community forecasts, the accuracy of which is instrumental in producing profitable investment forecasts. Having more data collected for a particular hedge strategy lends more credence to its distinction as a consensus forecast.

Presenting the hedge strategy forecasts that involve a particular company provides users with the ability to find more data of interest than might otherwise be available at the higher level of an industry category representation of top hedge strategy forecasts. The presentation of investment results for the community investment portfolios provides a compelling representation of the results from aggregating the collective input of individuals in the investment community.

Simulating the construction of community investment portfolios in the database provides a foundation for the creation of vendor-branded hedge funds. Presenting performance and rankings of the top performing members of the community engenders a friendly competitive spirit among members, encouraging consistent participation and repeat visits. Presenting member performance returns that represent overall and industry category performance calculations provides useful feedback to members regarding their forecasting aptitude at several levels. Presenting detailed investment performance calculations for each historical hedge strategy for a member provides justification for member rankings and performance returns.

An important benefit of the present invention is minimizing investment risk. Each hedge strategy produced by the system is a financially sound hedging mechanism which achieves full market neutrality through a carefully crafted combination of long and short positions. The model neutralizes systematic risk of the investment, leaving only specific risk of individual stock selection as the determinant of positive investment returns.

Systematic risk involves the extent to which a security's price fluctuates in relation to overall market movements. The system eliminates systematic risk by achieving full market neutrality in each hedge strategy stock market forecast by adopting characteristics such as beta neutrality, industry neutrality, and money neutrality.

Beta neutrality is a measure a stock's volatility in comparison to the market as a whole. When both stocks in a stock pairing have approximately the same beta, the stocks have the same correlation of price movements to the overall market. These correlated price movements are neutralized through the combination of long and short positions involving stocks with the same beta.

Regarding industry neutrality, with both stocks in a stock pairing being members of the same industry category, both stocks are exposed to approximately the same market factors at all times. These industry-specific risk factors are neutralized through the combination of long and short positions involving stocks in the same industry to create an especially accurate hedging mechanism.

Regarding money neutrality, with an equal monetary weighting assigned to both the long position and short position in a hedge strategy stock market forecast, an additional level of neutrality is achieved.

Specific risk involves the risk of a particular security's price fluctuations that are uncorrelated to overall market movements. Specific risk is unique to each individual security, representing the chances of successes or failures of a particular company. Portfolio theory dictates that specific risk can be removed through diversification by investing in a market portfolio comprised of many stocks, as the unrelated particular risks of each company naturally average out with a large sample size.

The system manages specific risk through a unique and calculated approach toward individual stock selection. Central to the system is the tabulation of input across individuals to arrive at a consensus representation of investor sentiment. By itself, the concept of taking a consensus view towards stock selection is a meaningful step towards managing specific risk. A group of individuals may more accurately forecast future price movements, as the supply and demand forces in the marketplace are best approximated by the preferences a group rather than by the preferences of an individual.

The system goes a step further toward managing specific risk by focusing on the performance of a particular stock relative to the performance of another stock. Therefore, the specific risk of one stock does not have to be considered in absolute terms; it is always relative to the specific risk of another stock. In other words, each random stock pairing presented to a user in essence requests that the user evaluate the prospects of the specific risks of one stock versus the prospects of the specific risks of another stock. Considering specific risk on a relative basis serves as a mitigating factor for reducing specific risk.

The system leverages the input of individuals in the investment community to produce investment strategies that can be implemented without the overhang of systematic market risk or the deleterious effects of unmanaged specific risk, leaving only the relative stock performance of consensus forecasts as the determinant for achieving positive investment returns.

BRIEF DESCRIPTION OF THE DRAWINGS

In the drawings, closely related figures and items have the same number but different alphabetic suffixes. Processes, states, statuses, and databases are named for their respective functions.

FIG. 4 shows a stock voting page on the website system.

FIG. 5 shows a category hedge strategies page on the website system.

FIG. 6 shows a company hedge strategies page on the website system.

FIG. 7 shows a community portfolios page on the website system.

FIG. 8 shows an overall member rankings page on the website system.

FIG. 9 shows a category member rankings page on the website system.

FIG. 10 shows a performance scorecard page on the website system.

FIG. 11 shows a category voting history page on the website system.

FIG. 12 shows a company voting history page on the website system.

DETAILED DESCRIPTION OF THE INVENTION, INCLUDING THE PREFERRED EMBODIMENT

Terminology

Figure 1:
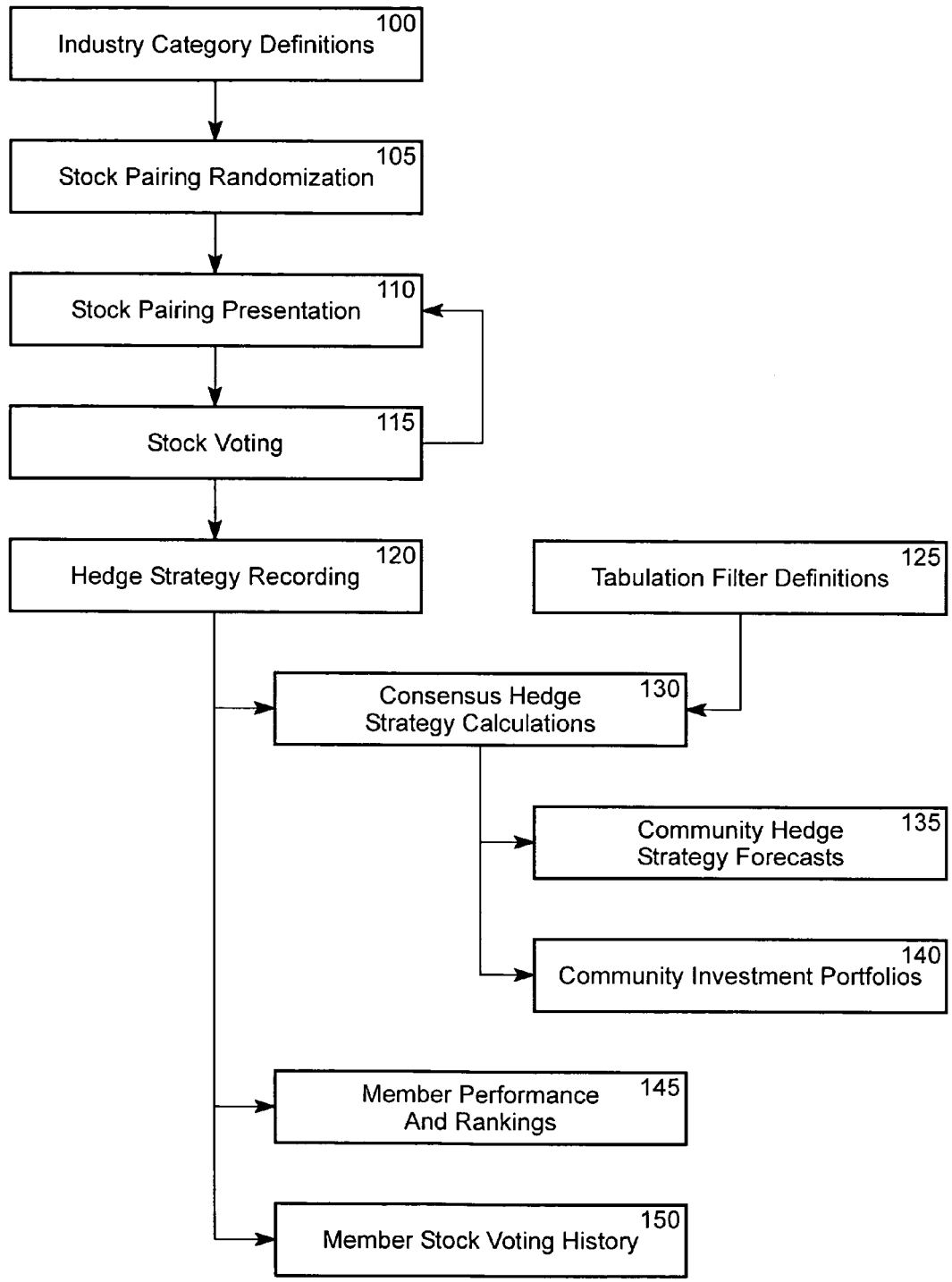
FIG. 1 is a flow diagram of the overall process of the system.

The terminology and definitions of the prior art are not necessarily consistent with the terminology and definitions of the current invention. As such, the following definitions, as used in the context of the invention, are provided.

"adjusted closing price"—A historically-modified stock price for a trading close date that factors in stock splits and dividends.

"agree votes"—A number of votes for a majority hedge strategy.

"beta"—A measure a stock's volatility in comparison to the market as a whole.

"calculation methodology"—A manner in which community history investment returns are computed (e.g. equal-weighted or vote-weighted).

"community category performance"—A theoretical investment return for a community investment portfolio for a performance period.

"community category unit value"—A unitized representation of the theoretical value of a simulated investment that represents a community investment portfolio on a trading day.

"community history"—A point-in-time snapshot of community consensus hedge strategies for a tabulation filter.

"community investment portfolio"—A periodic (e.g. daily) collection of community history records for an industry category that is measured by a calculation methodology.

"consensus hedge strategy"—A hedge strategy having a long position equal to the long position of a majority hedge strategy and a short position equal to the short position of a majority hedge strategy.

"disagree votes"—A number of votes for a minority hedge strategy.

"guest"—An unregistered user.

"hedge strategy"—The combination of both a long position and a short position.

"investment vehicle"—Any financial instrument used for investing, such as a stock, bond, mutual fund, or the like.

"majority hedge strategy"—A hedge strategy associated with a stock pairing that received a larger number of votes than its inverse.

"member"—A registered participant of the system.

"member category performance"—A member's theoretical investment return for a performance period and industry category.

"member category unit value"—A unitized representation of the theoretical value of a simulated investment that represents a member's hedge strategy forecasts for an industry category on a trading day.

"member overall performance"—A member's theoretical investment return for a performance period on an overall basis.

"member overall unit value"—A unitized representation of the theoretical value of a simulated investment that represents a member's hedge strategy forecasts on an overall basis on a trading day.

"minority hedge strategy"—A hedge strategy associated with a stock pairing that received a smaller number of votes than its inverse.

"performance period"—A time interval over which a performance return is calculated.

"rank"—A measure of a member's relative standing in a community for a performance period, either on an overall basis or for an industry category.

"tabulation filter"—A set of criteria that dictates a procedure for calculating consensus hedge strategy forecasts.

"trading close date"—A date/time value for the close of trading on a trading day.

"trading day"—A day that the stock market is open for trading.

"vote differential"—A number of votes for a majority hedge strategy minus a number of votes for a minority hedge strategy.

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made, without departing from the scope of the present invention.

The system provides a simple and engaging mechanism to solicit and capture input from networked individuals regarding future stock performance. The preferred embodiment of the system is an interactive website and database capable of recording, generating and presenting hedge strategy stock market forecasts based upon the collective input of individuals in the investment community.

Referring to FIG. 1, industry-focused categories and the basket of stocks that comprise them are defined (block 100) and stored in a database (not shown). The stocks that comprise an industry category are assigned sequence numbers (block 105) in preparation for random selection. A randomly-generated pair of stocks that a user has not yet evaluated is shown on a web page (block 110) in the form of two hypertext links, one for each stock ticker. The user casts a stock vote (block 115) by clicking the link for the stock that the user thinks will outperform the other one over, for example, the next 30 days. The stock vote is recorded (block 120) in the database as two market positions: 1) a long position for the stock chosen, and 2) a short position for the other stock with which it was paired.

Several tabulation filters are defined (block 125) and stored in the database which dictate the various arrangements available for calculating consensus hedge strategy forecasts. Each tabulation filter is defined by a combination of two filter settings: 1) whether guests are included, and 2) a maximum member category ranking.

For each stock pairing that has at least one hedge strategy stored in the database as a result of a stock vote, the system calculates various consensus hedge strategy representations (block 130) for that stock pairing (one for each tabulation filter). The magnitude of the consensus for a particular consensus hedge strategy is indicated by the vote differential. The vote differential for the consensus hedge strategy is determined by subtracting the number of votes for the minority hedge strategy from the number of votes for the majority hedge strategy.

For each industry category stored in the database, the system presents the most compelling hedge strategy forecasts from the community (block 135) for a given tabulation filter selection. Hedge strategies are sorted by the vote differentials (or other factor) in descending order, as calculated by the selected tabulation filter, thereby presenting the most compelling hedge strategy forecasts at the top of the list. Comparing the magnitude of the consensus for one hedge strategy with another hedge strategy enables users to gauge the relative strength of the forecast (as defined by the selected tabulation filter) as indicated by the community.

Community investment portfolios are constructed using various calculation methodologies (block 140) to systematically follow the universe of consensus hedge strategy forecasts for each industry category stored in the database. Using actual stock prices, theoretical investment returns are tabulated across all hedge strategies within community investment portfolios periodically (e.g. daily) in order to calculate the overall portfolio investment returns for various performance time intervals. The performance results for all community investment portfolios for all performance time intervals available in the database are presented for review by the user community.

The system uses actual stock prices to calculate the hypothetical investment returns that would have resulted from implementing each member's hedge strategies in the stock market, resulting in the presentation of member performance and rankings (block 145). Performance returns are computed periodically (e.g. daily) for various performance time intervals. Members are ranked by investment return at the overall level and for each industry category.

For each member in the community, the entire history of stock votes for that member is maintained in the database and is available for review (block 150) by the member at any time. For each industry category and company, the system presents personalized information including the member's stock voting history and corresponding since-inception performance returns for each hedge strategy using actual stock prices.

Figure 2:
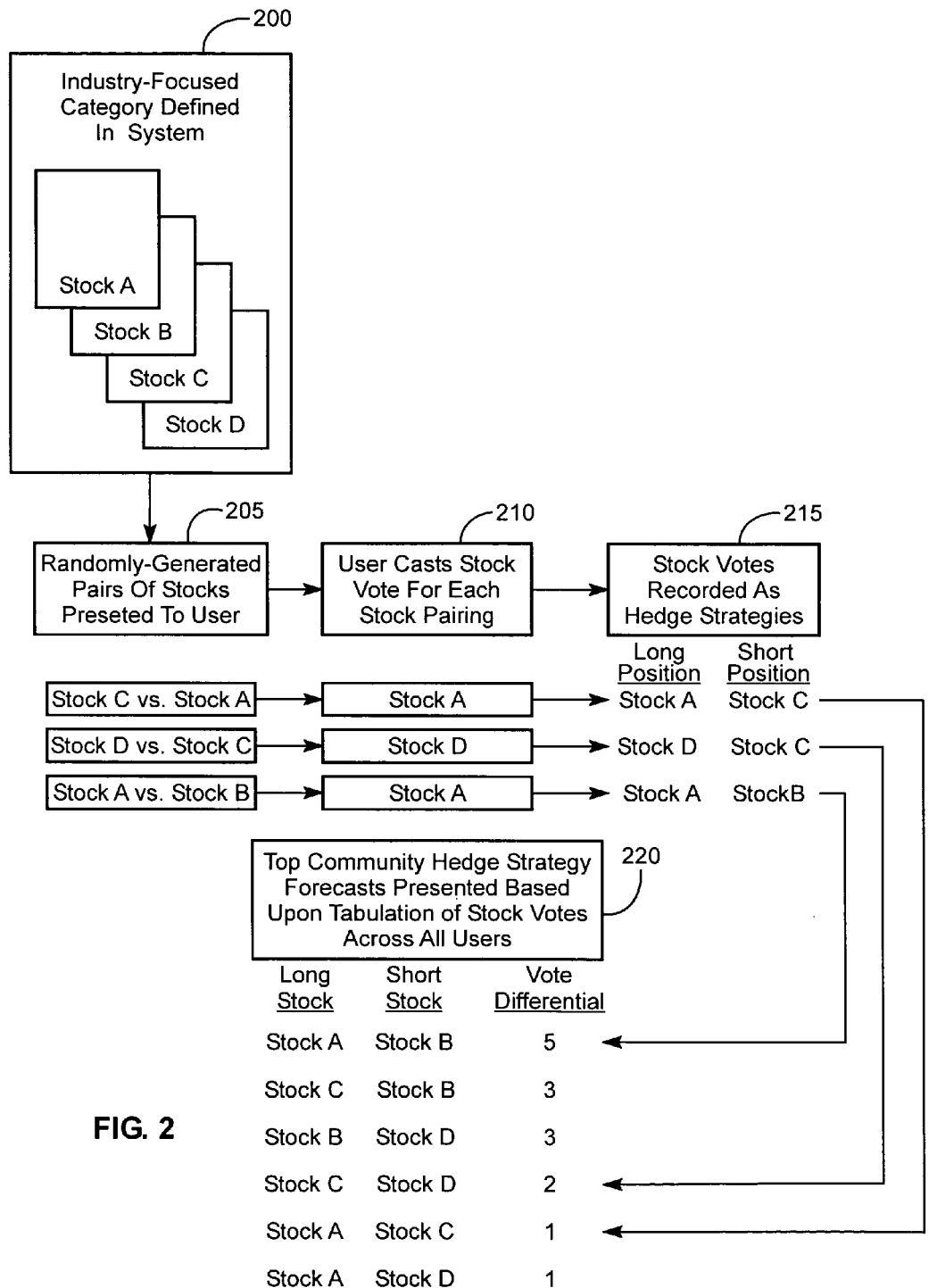
FIG. 2 shows a high-level example that illustrates several aspects of the system.

FIG. 2 shows a high-level example that illustrates several aspects of the system. A particular industry category is defined in the system as comprising several stocks (block 200). Randomly-generated pairs of stocks within the industry category are presented to the user (block 205). For each stock pairing, the user casts a stock vote by choosing the stock that the user thinks will outperform the other one over, for example, the next 30 days (block 210). The stock vote is recorded in the database as two market positions: 1) a long position for the stock chosen, and 2) a short position for the other stock with which it was paired (block 215). The user's stock vote is tabulated along with votes from other users for the same stock paring and presented in a list of top community hedge strategy forecasts as determined by vote differential calculations (block 220).

Figure 3A:
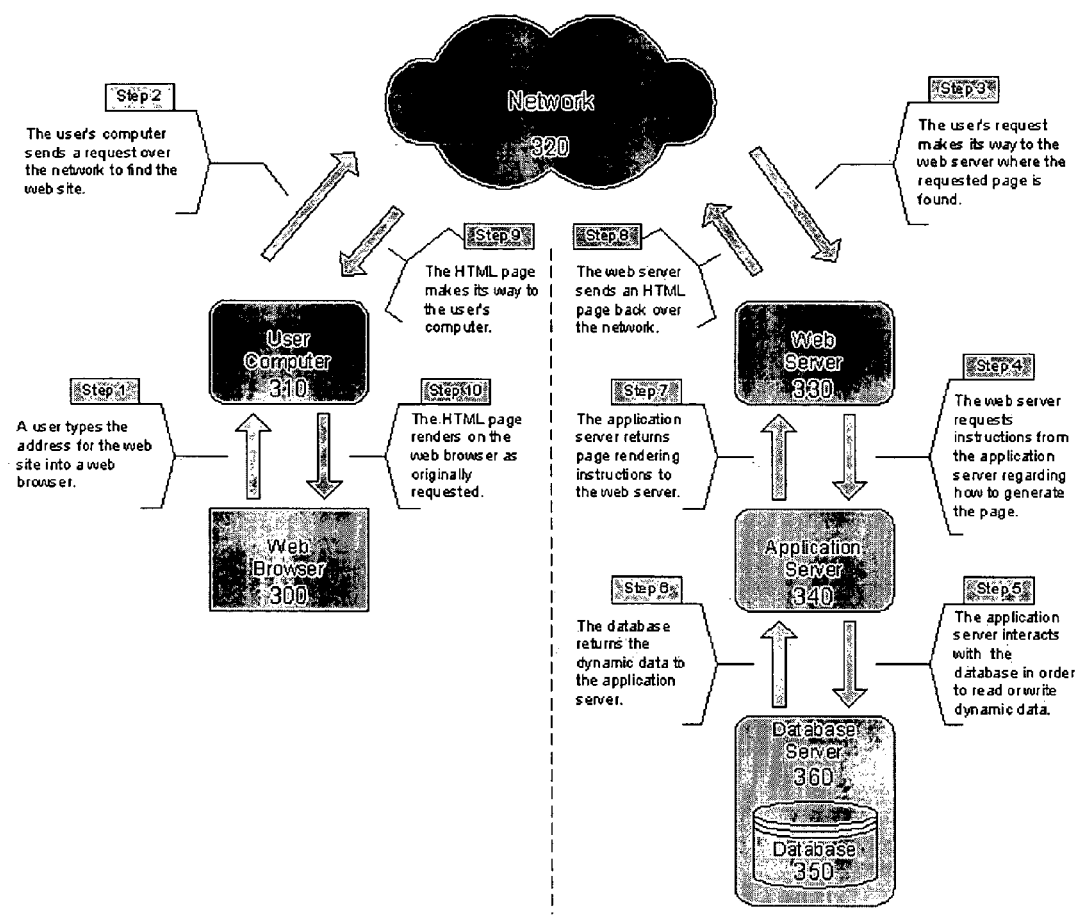
FIG. 3A is a high-level diagram of the system architecture.
Figure 3B:
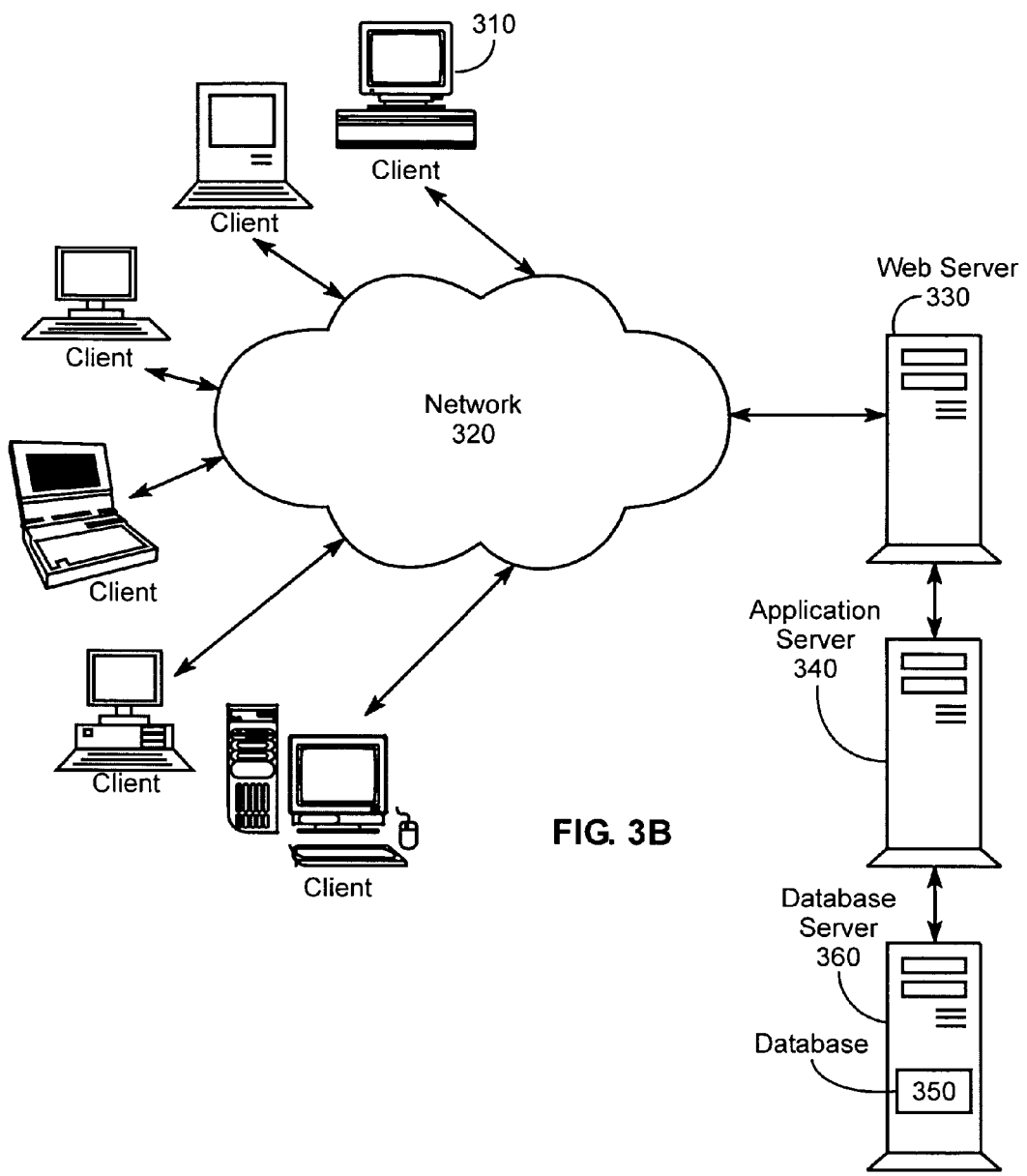
FIG. 3B is a diagram of the hardware architecture of the website system.

FIG. 3A shows how the system architecture of a website can be arranged to implement the present invention. The components of such a system include: a web browser 300, user (client) computer 310, network 320 (such as the Internet), web server 330, application server 340, database 350, and database server 360. The system can be adapted to run on any computer platform and system, web browser, web server, application server, and database. The system is designed to at least support all web browsers that conform to the HTML 4.01 specification by the World Wide Web Consortium (W3C) such as Microsoft Internet Explorer, Netscape Navigator, Apple Safari, Opera, Firefox, etc. In the preferred embodiment, the web server 330 is Apache, the application server 340 is Microsoft Windows Server, and the database server 350 is Microsoft SQL Server. It is to be understood that the web server 330, application server 340, database 350, and database server 360 can be configured to run on one or multiple physical computers in one or more geographic locations, that alternate platforms can be used for the database and for each server, and that alternate programming languages can be used.

The application server is a system which manages all information requests from the web server and interacts with the database in order to read or write dynamic data. The system's architecture is operable to support industry-standard application server systems such as BEA WebLogic, IBM Websphere, J2EE Enterprise JavaBeans, and Microsoft Windows Server.

The database is a system which serves as the information repository for all the data that supports the system. The database responds to dynamic requests from the application server and responds with the appropriate information. The system's architecture supports industry-standard relational database systems such as Oracle, Sybase and Microsoft SQL Server.

The processes involved in the present invention can be logically grouped into three segments: recording segment, generating segment, and presenting segment.

Recording Segment.

The recording segment includes industry category definitions. Industry Category records are defined in the system as containing the following data elements: Category ID (the unique identifier) and Category Name (the display name). Company records are defined in the system as containing the following data elements: Company ID (the unique identifier), Company Name (the display name), and Stock Ticker (the stock ticker). Category Definition records are defined in the system as containing the following data elements: Category ID (the industry category that is mapped to the company), Company ID (the company that is mapped to the industry category), and Sequence Number (a number that supports the random selection of a company within a particular industry category on the website).

The recording segment includes stock pairing randomization. The system updates the sequence numbers for category definition records in preparation for random selection from the website. The system cycles through each industry category stored in the database. For each industry category, the system determines the company count by counting the number of category definition records associated with the industry category. The system cycles through each category definition record associated with the industry category, processing each category definition record one at a time. A cycle count is maintained and incremented each time another category definition record is processed. For each category definition record, the sequence number is computed and updated using the following formula:

$$\text{sequence number} = \frac{\text{cycle count} - 0.5}{\text{company count}}.$$

Processing continues until all category definition records are updated for the industry category, and until all industry categories are processed.

The recording segment includes stock pairing presentation. The system retrieves a list of companies available for stock voting in random order for a particular user for a particular industry category. With a Category ID of the industry category, and a Member ID of the user, the system can produce a Company ID, a Stock Ticker, and a Company Name of a company available for stock voting.

The system conducts a process to determine the first stock in the stock pairing. For the specified industry category, the system determines the company count by counting the number category definition records associated with the industry category. A list of companies is retrieved that the user has involved in open stock votes (no close date) a number of times fewer than the company count minus one. For each company in the resulting list, the sequence number is obtained for the category definition record associated with the company and specified industry category. The system provides a random number between 0 and 1, then the list of companies is sorted by the following calculation in ascending order:

ABS(sequence number−random number).

The first company in the sorted list serves as the first stock in the stock pairing.

The system conducts a process to determine the second stock in the stock pairing. The system cycles through the remaining companies in the sorted list from above, processing each company one at a time. For each company, the system determines whether the company, when coupled with the first stock in the stock pairing, constitutes a stock voting pair that the user has involved in an open stock vote (no close date). Processing continues until a company is found for the second stock in the stock pairing such that the user does not have the stock pairing involved in an open stock vote (no close date).

The recording segment includes stock voting and hedge strategy recording. Stock Vote records are defined in the system as containing the following data elements: Stock Vote ID (the unique identifier), Member ID (the user who recorded the stock vote), Category ID (the industry category under which the stock vote was recorded), Start Date (the trading day on which the stock vote is starting), End Date (the trading day on which the stock vote is ending), Long Company ID (the company that was chosen by the user to outperform the other company in the stock pairing), Short Company ID (the company that was not chosen by the user in the stock pairing, Entry Date (the date/time that the stock vote was recorded), Close Date (the date/time that the stock vote was closed), Long Return (the since-inception long return for the stock vote), Short Return (the since-inception short return for the stock vote), Net Return (the since-inception net return for the stock vote), and Calculation Date (the trading day for which the since-inception performance returns were calculated).

When the user casts a stock vote by selecting the stock that the user thinks will outperform the other one over, for example, the next 30 days, the system conducts a process to record the stock vote in the database. With a Category ID of the industry category, a Member ID of the user, a Company ID of the stock that was chosen by the user, and a Company ID of the stock that was not chosen by the user, the system can record the stock vote in the database.

The system determines if the same stock vote already exists in the database for the user and is currently open (no close date). If the same stock vote does not already exist in the database for the user, then the system records the stock vote in the database as follows: the Category ID is set to the identifier of the industry category, the Member ID is set to the identifier of the user, the Start Date is set to the earliest trading close date that is after the current system date/time, the End Date is set to the earliest trading close date that is at least, for example, 30 calendar days after the start date, the Long Company ID is set to the identifier of the stock that was chosen by the user, the Short Company ID is set to the identifier of the stock that was not chosen by the user, and the Entry Date is set to the current system date/time.

The system determines if the inverse of the just-recorded stock vote already exists in the database for the user and is currently open (no close date). The inverse stock vote corresponding to the just-recorded stock vote has a Long Company ID equal to the Company ID of the stock that was not chosen by the user and a Short Company ID equal to the Company ID of the stock that was chosen by the user. If the inverse stock vote exists in the database for the user and is currently open (no close date), then the system updates the inverse stock vote record in the database as follows: the End Date is set to the earliest trading close date that is after the current system date/time, and the Close Date is set to the current system date/time.

Figures 4, 5:
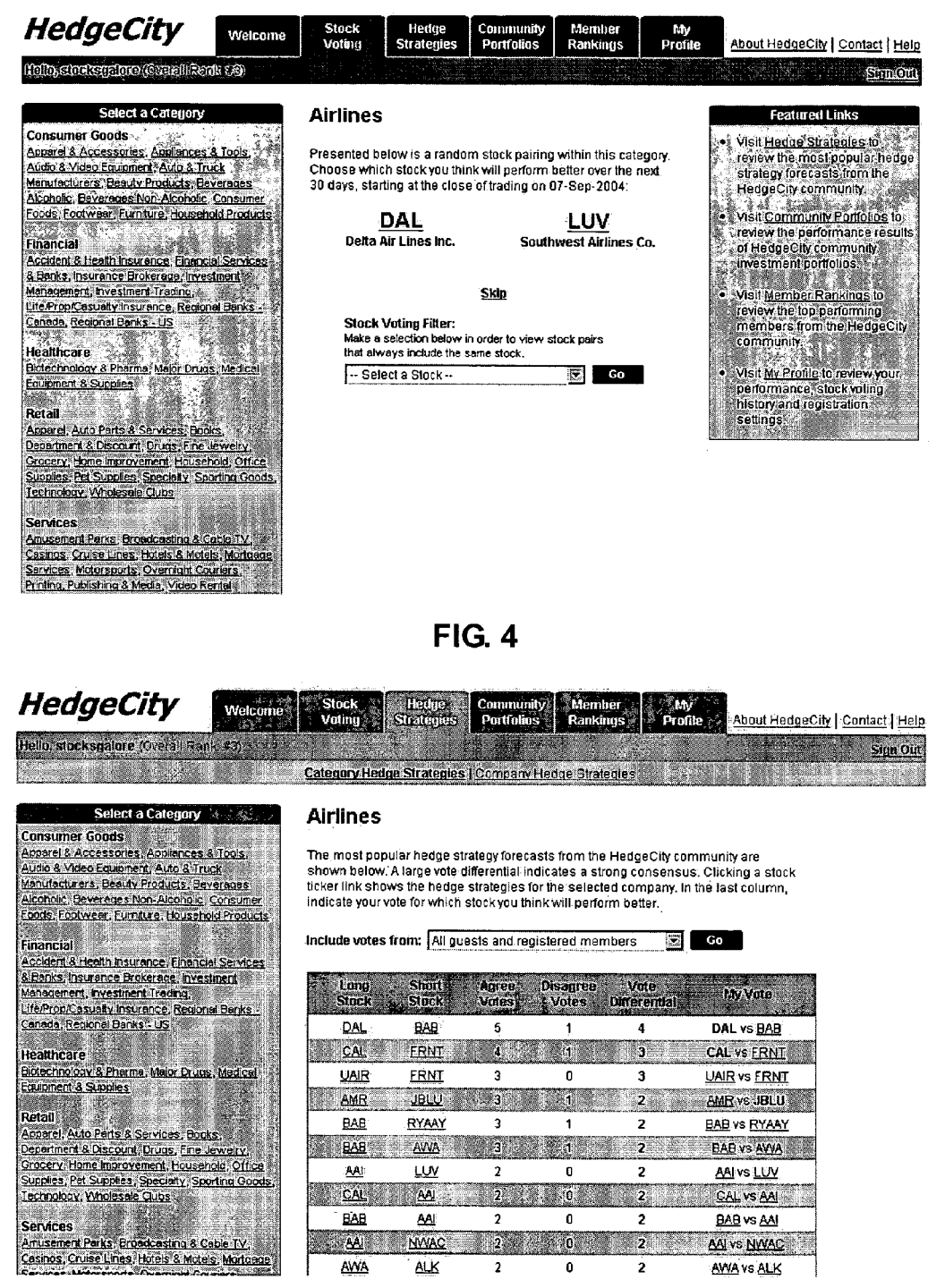

The recording segment of the present invention, as embodied in a website system, can be seen in FIG. 4, which illustrates the stock voting web page. The stock voting web page presents the user with the list of industry categories defined in the system. For a specified industry category, the stock voting web page presents the user with a randomly generated pair of stock ticker links from within the industry category that the user has not yet evaluated. The user casts a stock vote by selecting the ticker of the stock that the user thinks will outperform the other over, for example, the next 30 days. When the user casts a stock vote, the website system conducts a process to record the stock vote in the database as two market positions: 1) a long position for the stock chosen, and 2) a short position for the other stock with which it was paired. Upon casting a stock vote, the web page can present the user with a confirmation of the just-recorded stock vote along with another randomly generated pair of stock ticker links that the user has not yet evaluated.

Generating Segment.

The generating segment includes tabulation filter definitions. Tabulation Filter records are defined in the system as containing the following data elements: Tabulation Filter ID (the unique identifier), Filter Name (the display name), Guests Included Y/N (a setting that indicates whether stock votes from guests are included in consensus calculations), and Maximum Category Ranking (a setting that indicates the extent to which stock votes from ranked members in the community are included in consensus calculations. This setting is applicable if guests are not included in the calculations. An omitted value for this setting indicates that stock votes from all members, regardless of rank, will be included in consensus calculations. A number specified for this setting indicates that stock votes only from members who have an industry category ranking better than or equal to the number specified will be included in consensus calculations).

The generating segment includes consensus hedge strategy calculations. With a list of stock votes corresponding to a tabulation filter, the system can produce a list of consensus hedge strategies and the system computes the number of agree votes, number of disagree votes, vote differential, long stock information, and short stock information for each hedge strategy.

For each unique stock pairing represented within the list of stock votes, the system tabulates the number of votes for each of the two possible hedge strategies associated with the stock pairing. If one hedge strategy has more votes than the other hedge strategy, then the hedge strategy with the larger number of votes is considered as the majority hedge strategy and the hedge strategy with the smaller number of votes as the minority hedge strategy. If both hedge strategies have the same number of votes, then one hedge strategy is arbitrarily considered as the majority hedge strategy and the other as the minority hedge strategy.

The system defines the consensus hedge strategy as having a long position equal to the long position of the majority hedge strategy and a short position equal to the short position of the majority hedge strategy. The system provides information about each consensus hedge strategy as follows: the number of agree votes is set to the number of votes for the majority hedge strategy, the number of disagree votes is set to the number of votes for the minority hedge strategy, and the vote differential is set to the number of votes for the majority hedge strategy minus the number of votes for the minority hedge strategy.

Presenting Segment.

The presenting segment includes community hedge strategy forecasts. The system retrieves information from the database for the hedge strategy forecasts with the largest vote differentials for a particular industry category, or a particular company. This information is assembled from the tabulation of stock votes according to a particular tabulation filter. With a Category ID of the industry category or Company ID of the company, and a Tabulation Filter ID of the tabulation filter, the system can retrieve a list of all stock votes in the database that are currently open (no close date) for the specified industry category or specified company and satisfy the tabulation filter requirements for the specified tabulation filter. From the retrieved list of stock votes, the system can then produce a list of consensus hedge strategies.

The community hedge strategy forecasts aspect of the present invention, as embodied in a website system, can be seen in FIGS. 5-6. A table of hedge strategy forecasts with the largest vote differentials is shown on a category hedge strategies web page in FIG. 5 for a particular industry category and on a company hedge strategies web page in FIG. 6 for a particular company. For each hedge strategy listed in the table, the table can present the user with data values for the long stock ticker, short stock ticker, number of agree votes, number of disagree votes, vote differential, and the vote that was cast by the user.

The presenting segment includes community investment portfolios. Community History records are defined in the system as containing the following data elements: Community History ID (the unique identifier), Tabulation Filter ID (the tabulation filter relevant to the snapshot), Category ID (the industry category relevant to the snapshot), Snapshot Date (the trading day for which the data was captured), Long Company ID (the company that represents the long position of the majority hedge strategy), Short Company ID (the company that represents the short position of the majority hedge strategy), Agree Votes (the number of votes for the majority hedge strategy), Disagree Votes (the number of votes for the minority hedge strategy), and Vote Differential (the number of votes for the majority hedge strategy minus the number of votes for the minority hedge strategy).

The system conducts a process to create community history records that serve as periodic (e.g. daily) snapshots of community consensus hedge strategies, which are assembled for each tabulation filter. The system cycles through each tabulation filter stored in the database. For each tabulation filter, the system processes each industry category one at a time, retrieving a list of all stock votes in the database that are currently open (no close date) for a particular industry category. From the retrieved list of stock votes, the system can then produce a list of consensus hedge strategies.

For each consensus hedge strategy that has a vote differential greater than zero, the system records a community history record in the database as follows: the Tabulation Filter ID is set to the identifier of the tabulation filter, the Category ID is set to the identifier of the industry category, the Snapshot Date is set to the trading day for which the data was captured, the Long Company ID is set to the identifier of the company in the long position of the hedge strategy, the Short Company ID is set to the identifier of the company in the short position of the hedge strategy, the Agree Votes is set to the number of agree votes of the hedge strategy, the Disagree Votes is set to the number of disagree votes of the hedge strategy, and the Vote Differential is set to the vote differential of the hedge strategy. Processing continues until all industry categories are processed for the tabulation filter, and until all tabulation filters are processed.

Calculation Methodology records are defined in the system as containing the following data elements: Calculation Method ID (the unique identifier) and Calculation Method Type (the calculation method type). Community Category Unit Value records are defined in the system as containing the following data elements: Category ID (the industry category for which the unit value was calculated), Tabulation Filter ID (the tabulation filter for which the unit value was calculated), Calculation Method ID (the calculation methodology for which the unit value was calculated), Valuation Date (the trading day for which the unit value was calculated), and Unit Value (the unit value).

The system conducts a process to create community category unit value records which provide a unitized representation of the theoretical value of a simulated investment that represents a particular community investment portfolio on a particular trading day. With a particular trading day specified as the current trading day, the system determines the previous trading day, which is the trading day immediately prior to the current trading day. The system cycles through each industry category record, tabulation filter record, and calculation methodology record stored in the database.

The system determines if there is at least one community category unit value record that exists in the database for the industry category, tabulation filter and calculation methodology. If no record is found, then the system records a community category unit value record in the database as follows: the Category ID is set to the identifier of the industry category, the Tabulation Filter ID is set to the identifier of the tabulation filter, the Calculation Methodology ID is set to the identifier of the calculation methodology, the Valuation Date is set to the previous trading day, and the Unit Value is set to 100.

The system retrieves a list of all stock votes in the database for the industry category that have a start date equal to the previous trading day and satisfy the tabulation filter requirements for the tabulation filter. For each stock vote in the retrieved list, the system computes a net return using the previous trading day as the start trading day and the current trading day as the end trading day. The system obtains the long start price, which is the adjusted closing price for the company in the long stock position of the stock vote on the start trading day. The system obtains the long end price, which is the adjusted closing price for the company in the long stock position of the stock vote on the end trading day. The system obtains the short start price, which is the adjusted closing price for company in the short stock position of the stock vote on the start trading day. The system obtains the short end price, which is the adjusted closing price for the company in the short stock position of the stock vote on the end trading day.

The system computes the long return using the following formula:

$$\text{long return} = \frac{\text{long end price} - \text{long start price}}{\text{long start price}}.$$

The system computes the short return using the following formula:

$$\text{short return} = \frac{\text{short start price} - \text{short end price}}{\text{short start price}}.$$

The system computes the net return using the following formula:

$$\text{net return} = \frac{\text{long return} + \text{short return}}{2}.$$

The system computes a single net performance return value. If the calculation methodology is of type "equal weighted", then the single net performance return value is computed by taking an average of the individual stock vote net return figures across all stock votes in the list. If the calculation methodology is of the type "vote weighted", then the single net performance return value is computed using the following weighted-average calculation:

$$\text{single net performance return value} = \frac{\sum (\text{net return} * \text{vote differential})}{\sum \text{vote differential}}.$$

The system determines the previous unit value by obtaining the unit value associated with the industry category, tabulation filter and calculation methodology on the previous trading day. The current unit value is computed using the following formula:

current unit value=previous unit value*(1+single net performance return value).

The system records a community category unit value record in the database as follows: the Category ID is set to the identifier of the industry category, the Tabulation Filter ID is set to the identifier of the tabulation filter, the Calculation Methodology ID is set to the identifier of the calculation methodology, the Valuation Date is set to the current trading day, and the Unit Value is set to the current unit value. Processing continues until all industry category records, tabulation filter records and calculation methodology records are processed.

Performance Period records are defined in the system as containing the following data elements: Performance Period ID (the unique identifier), Period Name (the display name), Period Value (the number of units indicating the duration of the performance period), Value Type (the value type—day, week, month, year—associated with the Period Value), and Computation Method (the type of performance computation—annualized or cumulative). Community Category Performance records are defined in the system as containing the following data elements: Category ID (the industry category for which the return figure was calculated), Tabulation Filter ID (the tabulation filter for which the return figure was calculated), Calculation Method ID (the calculation methodology for which the return figure was calculated), Performance Period ID (the performance period for which the return figure was calculated), Calculation Date (the trading day for which the return figure was calculated), and Net Return (the net return).

The system conducts a process to create community category performance records which provide the theoretical investment returns for a community investment portfolio over various performance periods for a particular industry category. With a particular trading day specified as the current trading day, the system cycles through each industry category record, tabulation filter record, calculation methodology record and performance period record in the database. The system determines the starting day adjustment factor by obtaining the period value and value type for the performance period. The system determines the start trading day by adjusting the current trading day into the past using the starting day adjustment factor.

The system determines the beginning unit value by obtaining the unit value on the community category unit value record associated with the industry category, tabulation filter, calculation methodology, and start trading day. The system determines the ending unit value by obtaining the unit value on the community category unit value record associated with the industry category, tabulation filter, calculation methodology, and end trading day. The net return for the performance period is computed using the following formula:

$$\text{net return} = \frac{\text{ending unit value} - \text{beginning unit value}}{\text{beginning unit value}}.$$

The system records a community category performance record in the database as follows: the Category ID is set to the identifier of the industry category, the Tabulation Filter ID is set to the identifier of the tabulation filter, the Calculation Methodology ID is set to the identifier of the calculation methodology, the Performance Period ID is set to the identifier of the performance period, the Calculation Date is set to the current trading day, and the Net Return is set to the net return. Processing continues until all industry category records, tabulation filter records, calculation methodology records and performance period records are processed.

The community investment portfolios aspect of the present invention, as embodied in a website system, can be seen in FIG. 7, which illustrates the community portfolios web page. The community portfolios web page presents a table of theoretical performance returns over various performance periods for community investment portfolios, which systematically follow the community hedge strategy forecasts on a periodic (e.g. daily) basis.

The presenting segment includes member performance and rankings. Member Overall Unit Value records are defined in the system as containing the following data elements: Member ID (the member to which the unit value relates), Valuation Date (the trading day for which the unit value was calculated), and Unit Value (the unit value). The system conducts a process to create member overall unit value records which provide a unitized representation of the theoretical value of a simulated investment that represents a member's hedge strategy forecasts on an overall basis on a particular trading day. The system cycles through each member record stored in the database, creating member overall unit value records in a manner similar to other unit value record creation processes in the system.

Member Overall Performance records are defined in the system as containing the following data elements: Member ID (the member to which the return figure relates), Performance Period ID (the performance period for which the return figure was calculated), Calculation Date (the trading day for which the return and rank figures were calculated), Net Return (the net return), and Rank (the overall ranking). The system conducts a process to create member overall performance records which provide theoretical investment return and rank figures for a member over various performance periods on an overall basis. The system cycles through each member record and performance period record in the database, creating member overall performance records in a manner similar to other performance record creation processes in the system.

In order to determine ranking figures, the system cycles through each performance period record in the database. For each performance period, the system cycles through a list of member overall performance records associated with the performance period and sorted by net return in descending order. A cycle count is maintained and incremented each time another member overall performance record is processed. For each member overall performance record, the system updates the rank value by setting it equal to the cycle count. Processing continues until all member overall performance records are updated for the performance period, and until all performance period records are processed.

Member Category Unit Value records are defined in the system as containing the following data elements: Member ID (the member to which the unit value relates), Valuation Date (the trading day for which the unit value was calculated), Category ID (the industry category for which the unit value was calculated), and Unit Value (the unit value). The system conducts a process to create member category unit value records which provide a unitized representation of the theoretical value of a simulated investment that represents a member's hedge strategy forecasts for a particular industry category on a particular trading day. The system cycles through each member record and industry category record stored in the database, creating member category unit value records in a manner similar to other unit value record creation processes in the system.

Member Category Performance records are defined in the system as containing the following data elements: Member ID (the member to which the return figure relates), Performance Period ID (the performance period for which the return figure was calculated), Calculation Date (the trading day for which the return and rank figures were calculated), Category ID (the industry category for which the return figure was calculated), Net Return (the net return), and Rank (the industry category ranking). The system conducts a process to create member category performance records which provide theoretical investment return and rank figures for a member over various performance periods for a particular industry category. The system cycles through each member record, performance period record, and industry category record in the database, creating member category performance records and determining ranking figures in a manner similar to other performance record creation processes in the system.

The member performance and rankings aspect of the present invention, as embodied in a website system, can be seen in FIGS. 8-10. A table of top performing members of the community based upon theoretical hedge strategy performance is shown on an overall member rankings web page in FIG. 8 with performance on an overall basis, and on a category member rankings web page in FIG. 9 with performance for a particular industry category. For each member listed in the table, the table can present the user with data values for the rank, member name, and net return. A table of overall and industry category theoretical performance returns over various performance periods for a particular member is shown on a member scorecard web page in FIG. 10.

The presenting segment includes member stock voting history which, as embodied in a website system, can be seen in FIGS. 11-12. A table of stock votes for a particular member is shown on a category voting history web page in FIG. 11 with stock votes for a particular industry category, and on a company voting history web page in FIG. 12 with stock votes for a particular company. For each stock vote listed in the table, the table can present the user with data values for the start date, end date, long stock ticker, short stock ticker, since-inception long return, since-inception short return, and since-inception net return.

For the website system, the following is a preferred sequence of procedures for daily operation activities: 1) the system closes all stock vote records which have an end date equal to the most recently-ended trading close day, 2) the system obtains actual stock prices for a list of stock tickers and dates for which data is needed as of the most recently-ended trading close day, 3) the system imports actual stock prices into the database, 4) the system updates all stock vote records with theoretical since-inception performance return figures for the most recently-ended trading close day, 5) the system computes member overall unit values, 6) the system computes member overall performance and rankings, 7) the system computes member category unit values, 8) the system computes member category performance and rankings, 9) the system records community forecast snapshots, 10) the system computes community investment portfolio unit values, 11) the system computes community investment portfolio performance, and 12) the system updates category definition sequence numbers.

The invention claimed is:

1. An apparatus for determining hedge strategies from a community of users, the apparatus comprising:
   a database component operative to maintain a store of investment vehicles; and
   a computer to execute computer-executable instructions, the instructions defining process steps of:
      presenting an investment vehicle pairing to a user, the investment vehicle pairing comprising a first investment vehicle and a second investment vehicle;
      soliciting said user to make a vote to choose which of the first and second investment vehicle in said investment vehicle pairing will outperform the other investment vehicle in said investment vehicle pairing over a determined period of time; and
      calculating a hedge strategy forecast from said vote, wherein said vote is translated into a long position for the chosen investment vehicle in said investment vehicle pairing and a short position for the other investment vehicle in said investment vehicle pairing.

2. A website system for generating hedge strategy investment vehicle forecasts comprising:
   a database for maintaining investment vehicles categorized by industry; and
   a website server comprising a computer programmed to execute computer-executable instructions to:
      generate a random investment vehicle pairing, the random investment vehicle pairing comprising a first investment vehicle and a second investment vehicle;

present said random investment vehicle pairing to a user;
receive a vote from said user choosing which of the first and second investment vehicle from said random investment vehicle pairing will outperform the other investment vehicle in said random investment vehicle pairing;
calculate a hedge strategy from said vote, wherein said vote is translated into a long position for the chosen investment vehicle in said random investment vehicle pairing and a short position for the other investment vehicle in said random investment vehicle pairing;
record calculated hedge strategies from votes of multiple users; and
tabulate votes from said users for creating a consensus hedge strategy.

3. The website system of claim 2, further comprising presenting said user with another randomly generated investment vehicle pairing to evaluate.

4. The website system of claim 2, further comprising providing for comparing a hedge strategy from one pairing with a hedge strategy from another pairing.

5. The website system of claim 2, further comprising sorting and displaying consensus hedge strategy forecasts by investment vehicle and by a vote differential.

6. The website system of claim 2, further comprising tracking consensus hedge strategy forecasts for each industry category and constructing community investment portfolios.

7. The website system of claim 2, further comprising computing overall & industry category performance returns for each member for display.

8. The website system of claim 2, further comprising simulating construction of community investment portfolios.

9. The website system of claim 2, wherein said investment vehicles in said investment vehicle pairing have a similar correlation of price movements to an overall market.

10. The website system of claim 2, presenting an ordered list of hedge strategy forecasts.

11. The website system of claim 2, wherein said industry category, from which investment vehicles are randomly paired, is user selected.

12. The website system of claim 2, wherein each of the first and second investment vehicle presented in said pairing has an assigned hypertext link.

13. A non-transitory computer-readable medium having computer-executable instructions for performing a method comprising:
generating a random investment vehicle pairing of investment vehicles from an industry category, the random investment vehicle pairing comprising a first investment vehicle and a second investment vehicle;
presenting said random investment vehicle pairing to a user of a community;
receiving a vote from said user choosing which of the first and second investment vehicle from said random investment vehicle pairing will outperform the other investment vehicle in said random investment vehicle pairing;
calculating a hedge strategy from said vote, wherein said vote is translated into a long position for the chosen investment vehicle in said random investment vehicle pairing and a short position for the other investment vehicle in said random investment vehicle pairing;
recording hedge strategies from multiple users in said community of investment vehicle pairings presented to said users; and
tabulating votes from said users for creating a consensus hedge strategy.

14. In a networked computer system having a graphical user interface including a display and a vote device, a method of providing and selecting between investment vehicle pairings, the method performed by a computer executing computer-executable instructions, the method comprising:
retrieving a pair of randomly selected investment vehicles, the pair of randomly selected investment vehicles comprising a first investment vehicle and a second investment vehicle;
presenting a pair of hypertext links with each hypertext link representing a investment vehicle from said pair of randomly selected investment vehicles;
receiving a hypertext link vote indicative of which investment vehicle, from said pair of randomly selected investment vehicles, is believed will outperform the other investment vehicle over an identified period of time;
calculating a hedge strategy from said hypertext link vote, wherein said hypertext link vote is translated into a long position for the chosen investment vehicle from said pair of randomly selected investment vehicles and a short position for the other investment vehicle from said pair of randomly selected investment vehicles; and
in response to investment vehicle votes, calculating and presenting a consensus hedge strategy for said pair of randomly selected investment vehicles.

15. A method, performed by a computer executing computer-executable instructions, for determining a hedge strategy stock market forecast, the method comprising:
maintaining a database of stocks categorized by industry, the database being tangibly stored in a second computer-readable medium;
a computer generating a stock pairing of randomly selected stocks from a same industry category, the stock pairing comprising a first stock and a second stock;
presenting said stock pairing to a user;
requesting said user to vote on which of the first and second stock will outperform the other stock over an identified period of time;
receiving a vote from said user choosing which of the first and second stock in said stock pairing will outperform the other stock in said stock pairing;
recording a hedge strategy, wherein said vote is translated into a long position for the chosen stock in said stock pairing and a short position for the other stock in said stock pairing;
calculating a vote differential from users of a community for each of two possible hedge strategies associated with said stock pairing;
tabulating said votes for determining a consensus hedge strategy forecast for said stock pairing; and
presenting said consensus hedge strategy forecast to said user.

16. The method of claim 15, further comprising immediately presenting said user with another randomly generated stock pairing to evaluate.

17. The method of claim 15, further comprising providing for comparing a hedge strategy from one pairing with a hedge strategy from another pairing.

18. The method of claim 15, further comprising calculating since-inception investment returns that would have resulted from using a consensus hedge strategy.

19. The method of claim 15, wherein an equal monetary weighting is assigned to both the long position and short position in a hedge strategy stock market forecast.

20. The method of claim 15, wherein stock votes from guests are included in consensus calculations.

21. The method of claim 15, wherein stock votes are from registered community members.

22. The method of claim 15, wherein stock votes are from ranked members.

23. The method of claim 15, wherein hedge strategies are sorted based on said vote differential.

24. The method of claim 15, further comprising calculating a hypothetical investment return by weighting each hedge strategy investment return equally.

25. The method of claim 15, further comprising calculating a hypothetical investment return by weighting hedge strategy investment returns, that have a larger vote differential, more heavily than hedge strategy investment returns with a smaller vote differential.

* * * * *